(12) United States Patent
Oh et al.

(10) Patent No.: US 8,183,725 B2
(45) Date of Patent: May 22, 2012

(54) MOTOR AND RECORDING DISC DRIVING DEVICE

(75) Inventors: Jong Ryeol Oh, Seoul (KR); Kum Kyung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 211 days.

(21) Appl. No.: 12/654,532

(22) Filed: Dec. 22, 2009

(65) Prior Publication Data
US 2011/0050021 A1    Mar. 3, 2011

(30) Foreign Application Priority Data

Aug. 27, 2009 (KR) .................. 10-2009-0080023

(51) Int. Cl.
*H02K 1/28* (2006.01)
(52) U.S. Cl. .................. 310/67 R; 310/156.08
(58) Field of Classification Search .............. 310/67 R, 310/156.08, 156.12, 156.38
See application file for complete search history.

(56) References Cited

U.S. PATENT DOCUMENTS

| | | | |
|---|---|---|---|
| 6,194,360 B1 * | 2/2001 | Karis et al. | 508/438 |
| 6,252,319 B1 * | 6/2001 | Sudo et al. | 310/67 R |
| 2008/0030109 A1 * | 2/2008 | Takaki et al. | 310/67 R |
| 2008/0061646 A1 * | 3/2008 | Kodama et al. | 310/90 |
| 2009/0284866 A1 | 11/2009 | Ito et al. | |

FOREIGN PATENT DOCUMENTS

| | | |
|---|---|---|
| JP | 2007-14047 | 1/2007 |
| KR | 10-2007-0088171 | 8/2007 |
| KR | 10-2008-0046635 | 5/2008 |

OTHER PUBLICATIONS

Korean Office Action issued Dec. 29, 2010 in corresponding Korean Patent Application 10-2009-0080023.
Chinese Office Action dated Nov. 15, 2011 issued in corresponding Chinese Patent Application No. 200910258852.X

* cited by examiner

*Primary Examiner* — Quyen Leung
*Assistant Examiner* — Naishadh Desai

(57) ABSTRACT

A motor includes a shaft supporting a rotation of a rotor, a sleeve supporting the shaft such that an upper end of the shaft protrudes upward in an axial direction, a rotor case having a rotor hub, which is forcibly inserted and fixed to a protrusion of the shaft, and rotated by a rotation of the shaft, and an adhesive sealing space formed on an insertion surface between the protrusion and the rotor hub.

9 Claims, 5 Drawing Sheets

MOTOR AND RECORDING DISC DRIVING DEVICE

CROSS-REFERENCE TO RELATED APPLICATIONS

This application claims the priority of Korean Patent Application No. 10-2009-0080023 filed on Aug. 27, 2009, in the Korean Intellectual Property Office, the disclosure of which is incorporated herein by reference.

BACKGROUND OF THE INVENTION

1. Field of the Invention

The present invention relates to a motor and a recording disc driving device, and more particularly, to a motor which increases an unmating force between a shaft and a rotor hub and prevents an adhesive from flowing out of the shaft and the rotor hub when the rotor hub is forcibly inserted onto the shaft to be fixed with the adhesive, and a recording disc driving device having the same.

2. Description of the Related Art

In a small-sized spindle motor used in a recording disc driving device, a hydrodynamic bearing assembly is used. Oil is provided between a shaft and a sleeve of the hydrodynamic bearing assembly, and the hydrodynamic bearing assembly is a mechanism supporting the shaft through hydrodynamic pressure formed by the oil.

Recently, as the performance of recording disc driving devices has improved, demand for low current consumption, low Non-Repeatable Run Out (NNRO), impact resistance, and vibration resistance has rapidly increased.

To solve a problem in which oil overflows to the outside of a hydrodynamic bearing assembly due to a high-speed rotation of a shaft, studies on oil sealing have been continuously conducted.

An oil sealing portion may be formed on a thrust plate and an inner surface of a stopper ring for fixing the thrust plate. In this case, when a rotor hub is forcibly inserted onto the shaft, oil may overflow to a front side of the stopper ring to be mixed with an adhesive provided between the rotor hub and the shaft.

When the oil overflows to flow into an insertion surface between the rotor hub and the shaft, the adhesive does not properly harden. In this case, the rotor case may be separated.

SUMMARY OF THE INVENTION

An aspect of the present invention provides a motor which increases an unmating force between a shaft and a rotor hub and prevents an adhesive from flowing out of an insertion surface between the shaft and the rotor hub, when the rotor hub is forcibly inserted onto the shaft to be fixed with the adhesive, and a recording disc driving device having the same.

According to an aspect of the present invention, there is provided a motor including: a shaft supporting a rotation of a rotor; a sleeve supporting the shaft such that an upper end of the shaft protrudes upward in an axial direction; a rotor case having a rotor hub, which is forcibly inserted and fixed to a protrusion of the shaft, and rotated by a rotation of the shaft; and an adhesive sealing space formed on an insertion surface between the protrusion and the rotor hub.

The insertion surface between the protrusion and the rotor hub may include upper and lower insertion surfaces extending from the adhesive sealing space upward and downward in the axial direction, respectively.

The upper insertion surface may be disposed further inside than the lower insertion surface in an inner diameter direction.

The upper insertion surface may be disposed further outside than the lower insertion surface in an outer diameter direction.

The motor may further include a thrust plate provided under the sleeve; and a sleeve housing supporting the thrust plate and the sleeve.

The motor may further include: a thrust plate provided above the sleeve; and a stopper ring forcibly inserted to fix the thrust plate, while surrounding the thrust plate. An inner surface of the stopper ring may form a short gap with an outer circumference of the thrust plate in an outer diameter direction and a part of an upper surface of the thrust plate extending from the outer circumference in an inner diameter direction such that the short gap seals oil.

The rotor hub may have a recess formed in a portion thereof facing an upper portion of the stopper ring in the axial direction, the recess housing the stopper ring, and an inclined portion formed in a portion thereof facing the stopper ring in an inner diameter direction, the inclined portion being inclined from a lower side in the axial direction to an upper side in an outer diameter direction.

According to another aspect of the present invention, there is provided a recording disc driving device including: a motor rotating a recording disc; a head movement unit moving a head to the recording disc, the head detecting information of the recording disc mounted on the motor; and a housing accommodating the motor and the head movement unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
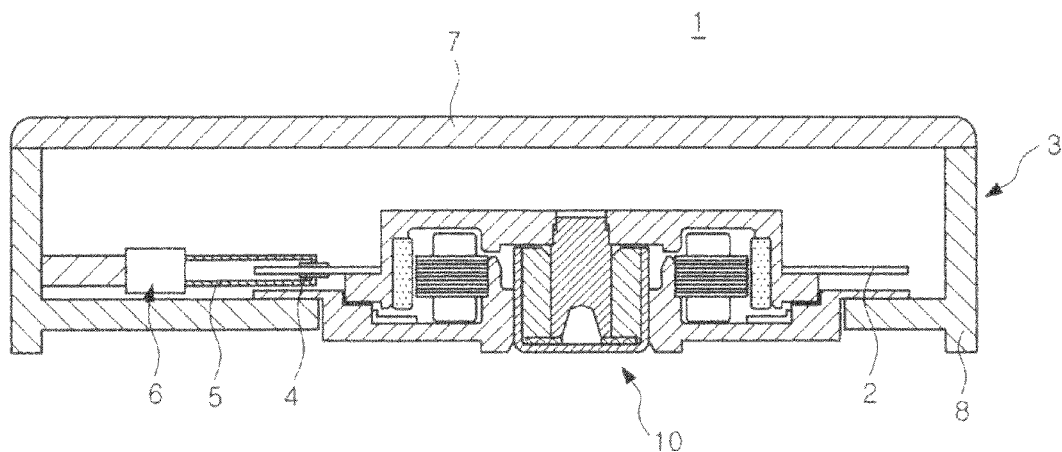
FIG. 1 is a schematic perspective view of a recording disc driving device having a motor mounted therein according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

FIG. 1 is a schematic perspective view of a recording disc driving device having a motor mounted therein according to an embodiment of the present invention.

Referring to FIG. 1, the recording disc driving device 1 according to this embodiment of the present invention is a hard disc driving device and includes a motor 10, a head movement unit 6, and a housing 3.

The motor 10 has all the features of a motor according to another embodiment of the present invention which will be described below, and a recording disc 2 is mounted on the motor 10.

The head movement unit 6 moves a head 4 onto a surface of the recording disc 2 from which information is to be detected, the head 4 detecting information of the recording disc 2 mounted on the motor 10. The head 4 is disposed on a support portion of the head movement unit 6.

The housing 3 may include a motor mounting plate 8 and a top cover 7 covering the upper part of the motor mounting plate 8, in order to form an internal space for accommodating the motor and the head movement unit 6.

Hereinafter, the motor 10 used in the recording disc driving device 1 according to the embodiment of the present invention will be described in detail.

Figure 2:
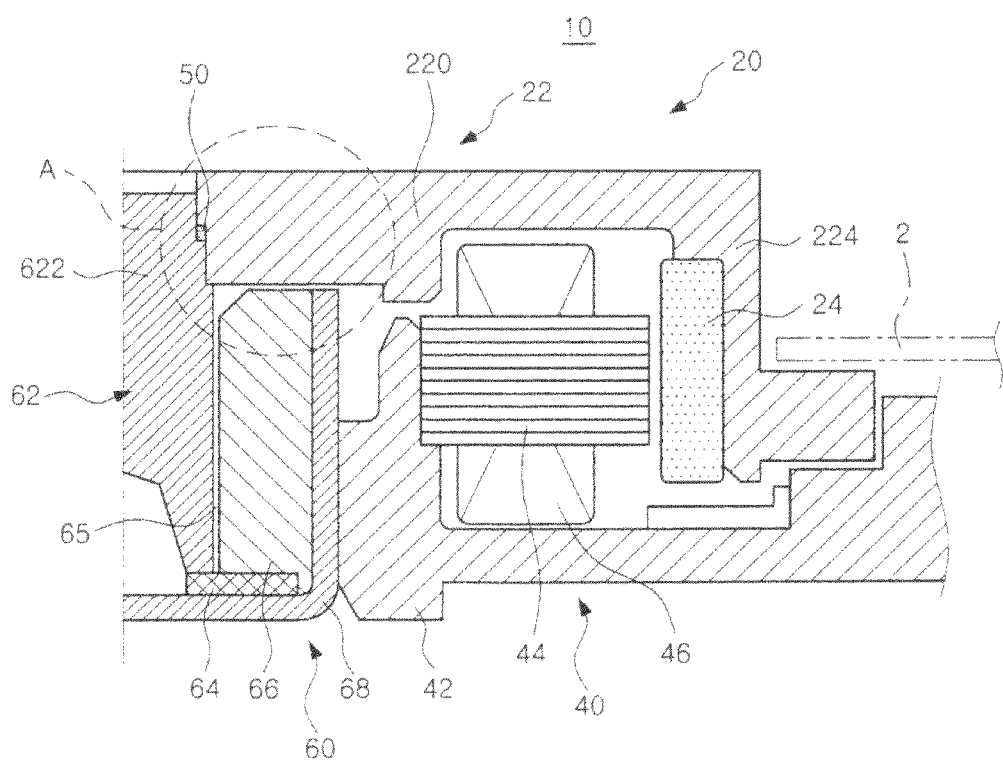
FIG. 2 is a schematic cross-sectional view of the motor according to the embodiment of the present invention.
Figure 3:
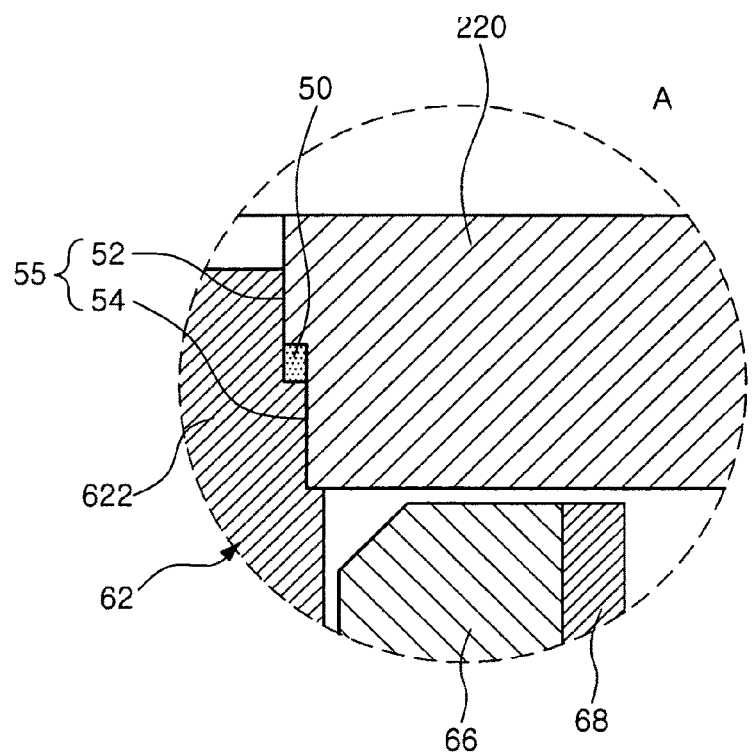
FIG. 3 is a schematic expanded cross-sectional view of an example of a portion A of FIG. 2.

FIG. 2 is a schematic cross-sectional view of the motor according to the embodiment of the present invention. FIG. 3 is a schematic expanded cross-sectional view of an example of a portion A of FIG. 2.

Referring to FIGS. 2 and 3, the motor 10 according to the embodiment of the present invention may include a shaft 62, a sleeve 66, a rotor case 22, and a rotor hub 220.

The hydrodynamic motor 10 according to the embodiment of the present invention is roughly composed of a rotor 20, a stator 40, and a bearing assembly 60.

The rotor 20 includes a cup-shaped rotor case 22 having a ring-shaped magnet 24 provided on an outer circumference thereof, the magnet 24 corresponding to a coil 46 of the stator 40. The magnet 24 is a permanent magnet in which N poles and S poles are alternately magnetized in a circumferential direction to generate a predetermined magnetic force.

The stator 40 includes a support portion 42 into which the outer diameter of a sleeve housing 68 fits, a plurality of cores 44 fixed to the support portion 42, and the coil 46 surrounding the cores 44.

The rotor 20 is rotated by an electromagnetic interaction between the coil 46 and the magnet 24.

The bearing assembly 60 disposed inside the support portion 42 of the stator 40 includes the shaft 62 supporting the rotation of the rotor 20, the sleeve 66 into which the shaft 62 is inserted and fitted and which supports the shaft 62 such that an upper end of the shaft 62 protrudes upward in an axial direction, and the sleeve housing 68 into which the outer diameter of the sleeve 66 fits and by which the sleeve 66 is supported.

The shaft 62 is inserted with a short gap provided between the shaft 62 and a shaft hole 65 of the sleeve 66. The short gap is filled with oil, and the rotation of the rotor 20 may be more smoothly supported by a dynamic pressure generated by a radial dynamic pressure groove formed on an inner circumference of the sleeve 66.

The bearing assembly 60 shown in FIG. 2 has a structure in which a thrust plate 64 is disposed at a lower side of the sleeve 66 in an axial direction. The thrust plate 64 has a thrust dynamic groove formed therein, the thrust dynamic groove providing a thrust dynamic groove to the shaft 62.

Meanwhile, terms in regards to directions may be defined as follows. In FIG. 2, the axial direction means a vertical direction with the shaft 62 set to a reference point, and an inner or outer diameter direction means an outer-end direction of the rotor 20 with the shaft 62 set to a reference point or a central direction of the shaft 62 with an outer end of the rotor 20 set to a reference point.

The rotor case 22 includes the rotor hub 220 and a magnet support portion 224. The rotor hub 220 is forcibly inserted and fixed to an upper end of the shaft 62, and the magnet support portion 224 extends in the outer diameter direction from the rotor hub 220 and is bent downward in the axial direction to support the magnet 24 of the rotor 20.

The rotor case 22 is forcibly inserted onto the upper end of the shaft 62, and the upper end of the shaft 62 protrudes to an upper side of the sleeve 66 in the axial direction to form a protrusion 622 of the sleeve 66.

The rotor hub 220 is forcibly inserted and fixed to the protrusion 622 of the shaft 62, and the rotor case 22 is rotated by a rotation of the shaft 62.

An adhesive sealing space 50 may be formed on an insertion surface 55 between the protrusion 622 and the rotor hub 220.

The insertion surface 55 extends from the adhesive sealing space 50 upward and downward in the axial direction. That is, the insertion surface 55 includes an upper insertion surface 52 extending upward in the axial direction and a lower insertion surface 54 extending downward in the axial direction.

FIG. 3 illustrates a case in which the upper insertion surface 52 is formed to be disposed further inside than the lower insertion surface 54 in the inner diameter direction.

Figure 4:
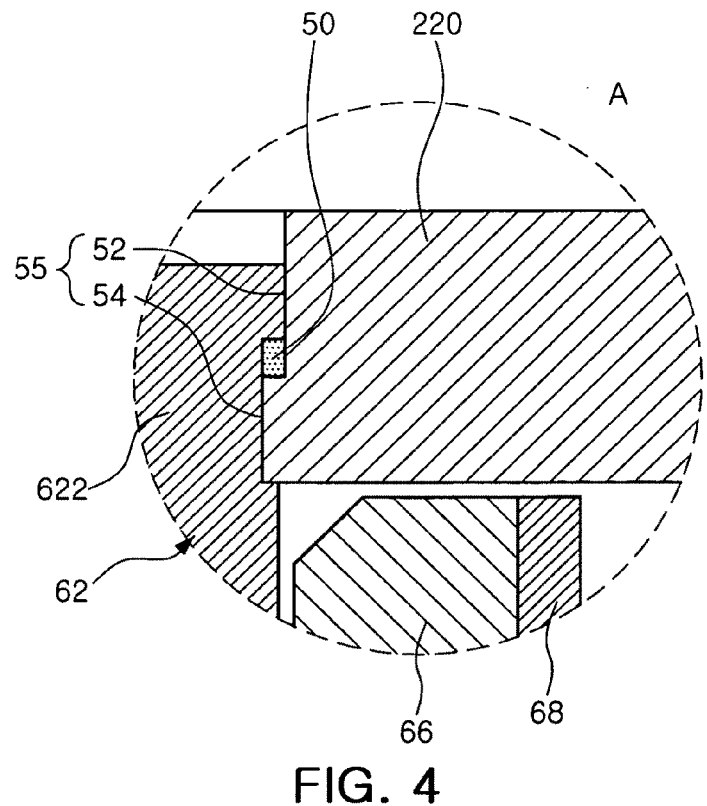
FIG. 4 is a schematic expanded cross-sectional view of another example of the portion A of FIG. 2.

FIG. 4 is a schematic expanded cross-sectional view of another example of the portion A of FIG. 2.

FIG. 4 illustrates a case in which the upper insertion surface 52 is formed to be disposed further outside than the lower insertion surface 54 in the outer diameter direction.

Figure 5:
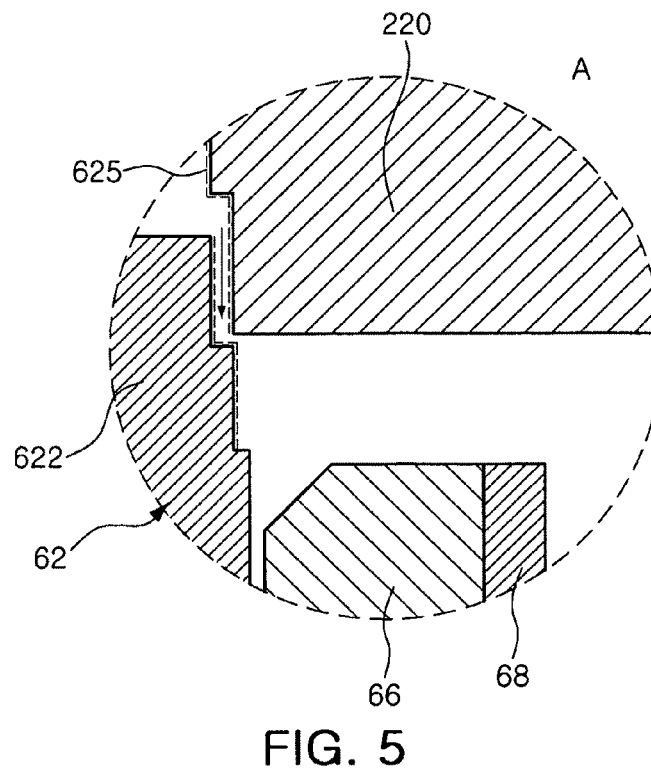
FIG. 5 is an extended diagram showing a state in which the portion A of FIG. 2 is assembled.

FIG. 5 is an extended diagram showing a state in which the portion A of FIG. 2 is assembled.

Referring to FIG. 5, the protrusion 622 of the shaft 62 and the rotor hub 220 has a stepped portion to form the adhesive sealing space 50 as shown in FIG. 3.

At this time, a thermal curing adhesive is applied to the respective stepped portions, and the rotor hub 220 is forcibly inserted onto the protrusion 622 of the shaft 62 to complete the assembly.

Figure 6:
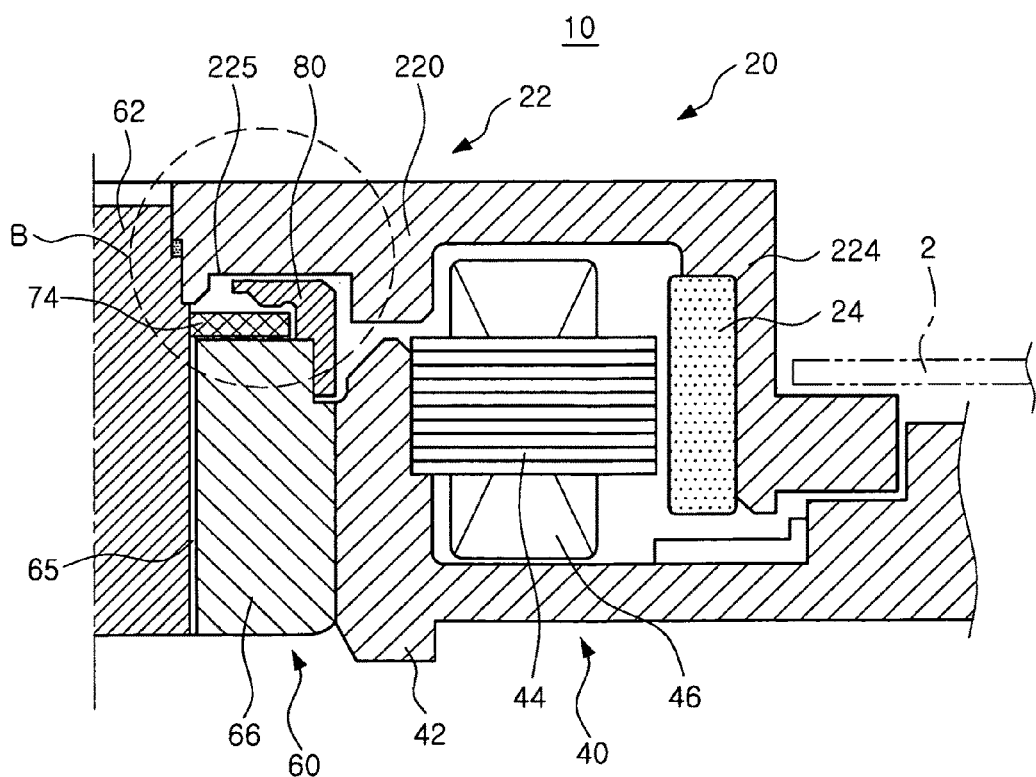
FIG. 6 is a schematic cross-sectional view of a motor according to another embodiment of the present invention.
Figure 7:
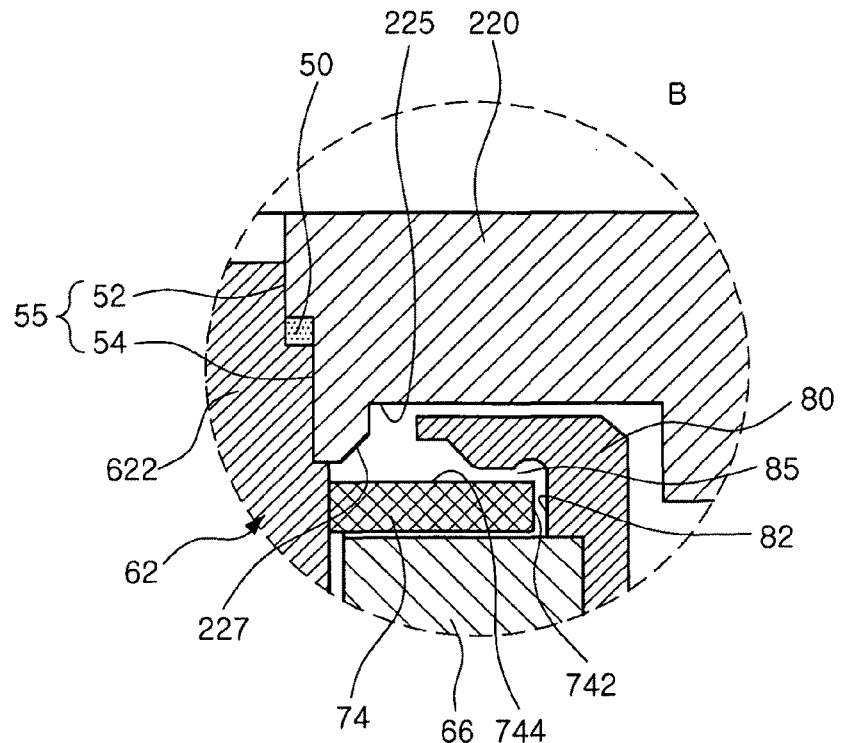
FIG. 7 is a schematic expanded cross-sectional view of an example of a portion B of FIG. 6.
Figure 8:
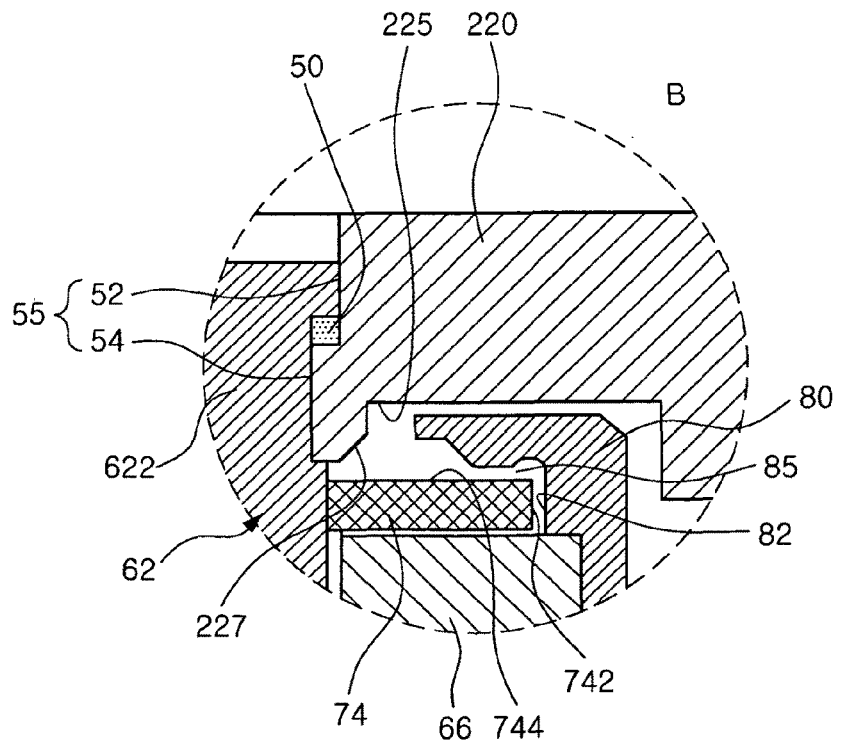
FIG. 8 is a schematic expanded cross-sectional view of another example of the portion B of FIG. 6.
Figure 9:
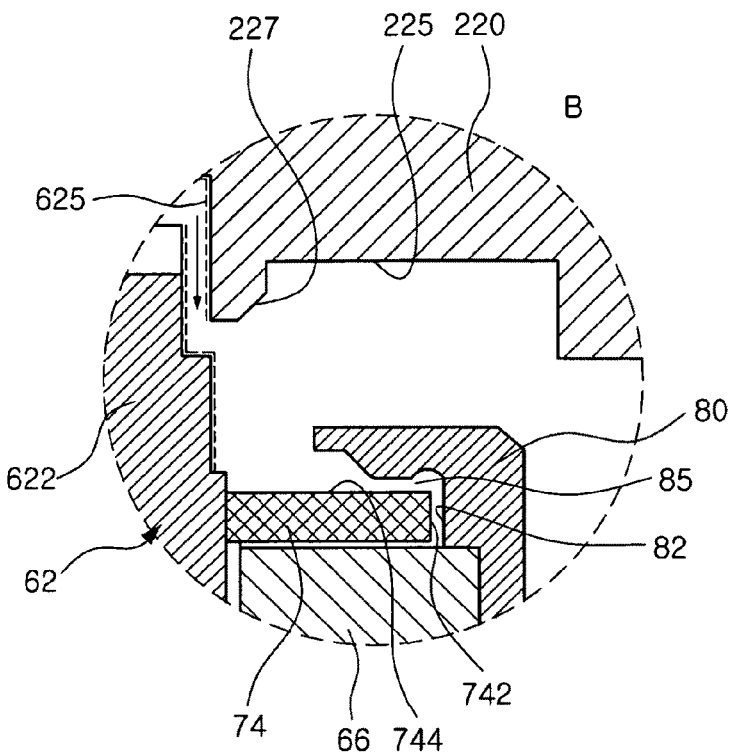
FIG. 9 is an expanded diagram showing a state in which the portion B of FIG. 6 is assembled.
Figure 10:
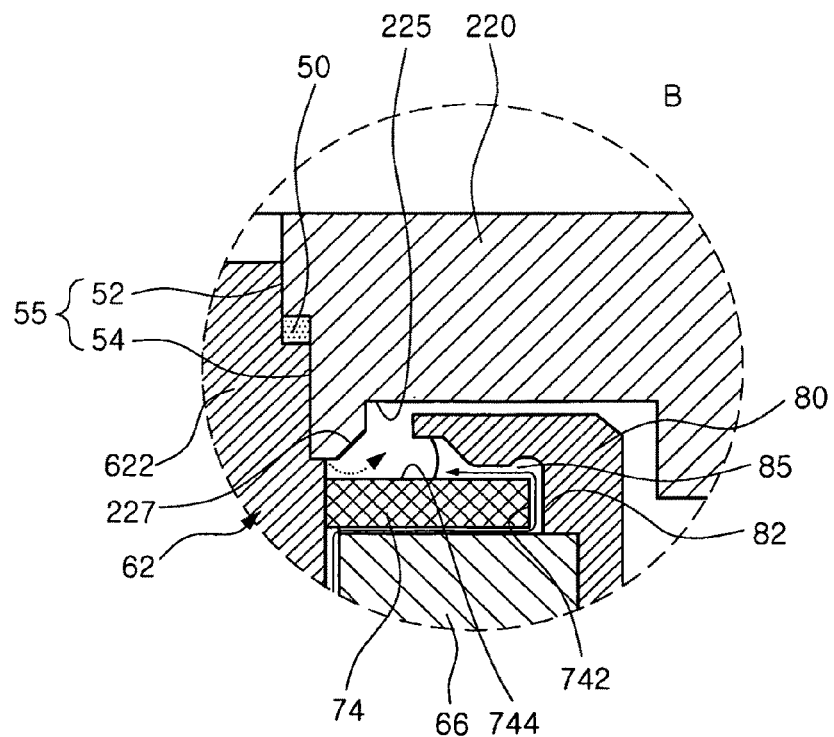
FIG. 10 is a diagram showing a state in which an adhesive and oil are prevented from being mixed in the motor of FIG. 5

FIG. 6 is a schematic cross-sectional view of a motor according to another embodiment of the present invention. FIG. 7 is a schematic expanded cross-sectional view of an example of a portion B of FIG. 6. FIG. 8 is a schematic expanded cross-sectional view of another example of the portion B of FIG. 6. FIG. 9 is an expanded diagram showing a state in which the portion B of FIG. 6 is assembled. FIG. 10 is a diagram showing a state in which an adhesive and oil are prevented from being mixed in the motor of FIG. 5.

The motor according to the embodiment of FIGS. 6 to 10 has a different structure from the embodiment of FIGS. 2 to 5 in that a thrust plate 74 is provided above the sleeve 66, and a stopper ring 80 is forcibly inserted to surround the thrust plate 74 and a side portion of the sleeve 66 and supports the thrust plate 74.

The rotor hub 220 may have a recess 225 formed in a portion thereof facing the stopper ring 80 in the axial direction, the recess 225 housing the stopper ring 80. Furthermore, the rotor hub 220 may have an inclined portion 227 formed in a portion thereof facing the stopper ring 80 in the inner diameter direction, the inclined portion 227 being inclined from the lower side in the axial direction to the upper side in the outer diameter direction.

In particular, an inner surface 82 of the stopper ring 80 forms a short gap 85 with an outer circumference 742 of the thrust plate 74 in the outer diameter direction and a part of an upper surface 744 extending from the outer circumference 742 in the inner diameter direction. The short gap 85 may seal oil.

The examples of the adhesive sealing space 50 formed on the insertion surface 55 between the protrusion 622 of the shaft 62 and the rotor hub 220 are substantially the same as those of FIGS. 2 to 5. Therefore, the specific descriptions thereof will be omitted.

In this embodiment, however, oil is sealed by the short gap 85 as shown in FIG. 10. When the rotor hub 220 is forcibly inserted onto the shaft 62, oil may overflow in the inner diameter direction of the stopper ring 80, as indicated by a solid line arrow of FIG. 10.

The inclined portion 227 serves to prevent the overflowing oil and an adhesive from being mixed, the adhesive flowing out when the rotor hub 220 is forcibly inserted onto the protrusion 622 of the shaft 62.

In the motor and the recording disc driving device according to the embodiments of the present invention, the length of the insertion surface between the shaft and the rotor hub may be enlarged in such a manner that the shaft stably supports the rotor.

Since an adhesive is sealed in the space formed between the shaft and the rotor hub, it is possible to prevent the adhesive from flowing out of the insertion surface between the shaft and the rotor hub.

In the motor having the oil sealing portion formed between the thrust plate of the sleeve and the stopper ring for fixing the thrust plate, when the rotor hub is forcibly inserted onto the shaft, oil may overflow to a front side of the stopper ring. In this case, the oil may be prevented from being mixed with an adhesive flowing out of the insertion surface between the shaft and the rotor hub.

Since the oil is prevented from overflowing and flowing into the insertion surface between the rotor hub and the shaft, it is possible to prevent oil from keeping the adhesive from hardening.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
a shaft supporting a rotation of a rotor;
a sleeve supporting the shaft such that an upper end of the shaft protrudes upward in an axial direction;
a rotor case having a rotor hub, which is forcibly inserted and fixed to a protrusion of the shaft, and rotated by a rotation of the shaft; and
an adhesive sealing space formed on an insertion surface between the protrusion and the rotor hub,
wherein the insertion surface between the protrusion and the rotor hub comprises upper and lower insertion surfaces extending from the adhesive sealing space upward and downward in the axial direction, respectively, and
wherein the upper insertion surface is disposed further outside than the lower insertion surface in an outer diameter direction.

2. The motor of claim 1, further comprising:
a thrust plate provided under the sleeve; and
a sleeve housing supporting the thrust plate and the sleeve.

3. A recording disc driving device comprising:
a motor of claim 1, the motor rotating a recording disc;
a head movement unit moving a head to the recording disc, the head detecting information of the recording disc mounted on the motor; and
a housing accommodating the motor and the head movement unit.

4. A motor comprising:
a shaft supporting a rotation of a rotor;
a sleeve supporting the shaft such that an upper end of the shaft protrudes upward in an axial direction;
a rotor case having a rotor hub, which is forcibly inserted and fixed to a protrusion of the shaft, and rotated by a rotation of the shaft;
an adhesive sealing space formed on an insertion surface between the protrusion and the rotor hub;
a thrust plate provided above the sleeve; and
a stopper ring forcibly inserted to fix the thrust plate, while surrounding the thrust plate,
wherein an inner surface of the stopper ring forms a short gap with an outer circumference of the thrust plate in an outer diameter direction and a part of an upper surface of the thrust plate extending from the outer circumference in an inner diameter direction such that the short gap seals oil.

5. The motor of claim 4, wherein the rotor hub has a recess formed in a portion thereof facing an upper portion of the stopper ring in the axial direction, the recess housing the stopper ring, and an inclined portion formed in a portion thereof facing the stopper ring in an inner diameter direction, the inclined portion being inclined from a lower side in the axial direction to an upper side in an outer diameter direction.

6. The motor of claim 4, wherein the insertion surface between the protrusion and the rotor hub comprises upper and lower insertion surfaces extending from the adhesive sealing space upward and downward in the axial direction, respectively.

7. The motor of claim 6, wherein the upper insertion surface is disposed further inside than the lower insertion surface in an inner diameter direction.

8. The motor of claim 6, wherein the upper insertion surface is disposed further outside than the lower insertion surface in an outer diameter direction.

9. A recording disc driving device comprising:
a motor of claim 4, the motor rotating a recording disc;
a head movement unit moving a head to the recording disc, the head detecting information of the recording disc mounted on the motor; and
a housing accommodating the motor and the head movement unit.

* * * * *